(12) United States Patent
Gallant et al.

(10) Patent No.: US 9,371,125 B2
(45) Date of Patent: Jun. 21, 2016

(54) FUSELAGE ELEMENT COMPRISING A FUSELAGE SEGMENT AND JOINING MEANS

(75) Inventors: Guillaume Gallant, Lareole (FR);
Romain Delahaye, Colomiers (FR);
Marc Dugerie, Encausse (FR);
Marc-Antoine Castanet, Plaisance du Touch (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 0 days.

(21) Appl. No.: 13/381,673

(22) PCT Filed: Jul. 2, 2010

(86) PCT No.: PCT/FR2010/000489
§ 371 (c)(1),
(2), (4) Date: Dec. 30, 2011

(87) PCT Pub. No.: WO2011/001050
PCT Pub. Date: Jan. 6, 2011

(65) Prior Publication Data
US 2012/0104170 A1    May 3, 2012

(30) Foreign Application Priority Data
Jul. 3, 2009 (FR) ...................................... 09 54626

(51) Int. Cl.
*B64C 1/12* (2006.01)
*B64C 1/06* (2006.01)
(52) U.S. Cl.
CPC ................. *B64C 1/061* (2013.01); *B64C 1/064* (2013.01); *B64C 1/068* (2013.01); *B64C 1/12* (2013.01)

(58) Field of Classification Search
CPC .................................. B64C 1/12; B64C 1/069
USPC .................................. 244/119, 120, 131, 132
See application file for complete search history.

(56) References Cited

U.S. PATENT DOCUMENTS 4,888,451 A * 12/1989 Toni et al. ................... 174/94 R
5,242,523 A *  9/1993 Willden et al. .............. 156/285
(Continued)

FOREIGN PATENT DOCUMENTS

EP    1 541 464    6/2005
FR    2 906 008    3/2008
(Continued)

OTHER PUBLICATIONS

International Search Report Issued Oct. 15, 2010 in PCT/ FR10/00489 Filed Jul. 2, 2010.
(Continued)

*Primary Examiner* — Christopher P Ellis
*Assistant Examiner* — Michael Wang
(74) *Attorney, Agent, or Firm* — Oblon, McClelland, Maier & Neustadt, L.L.P.

(57) ABSTRACT

A fuselage element including a fuselage segment including a skin and a junction means for connecting the skin to an adjacent fuselage segment. The fuselage segment extends along a longitudinal axis of the fuselage, and the skin includes a first section at at least one end of the fuselage segment. The fuselage segment includes at least one longitudinal stiffening element for the fuselage. A junction member is arranged so as to contact an outer surface of the first section of the skin, and the stiffening element partially extends to the junction member along the longitudinal axis.

20 Claims, 5 Drawing Sheets

(56) References Cited

U.S. PATENT DOCUMENTS

| | | | |
|---|---|---|---|
| 5,518,208 A * | 5/1996 | Roseburg | 244/132 |
| 6,554,225 B1 * | 4/2003 | Anast et al. | 244/117 R |
| 6,964,723 B2 * | 11/2005 | Lindsay et al. | 156/285 |
| 7,857,258 B2 * | 12/2010 | Normand et al. | 244/120 |
| 8,282,042 B2 * | 10/2012 | Parikh et al. | 244/132 |
| 8,356,771 B2 * | 1/2013 | Kern et al. | 244/131 |
| 8,393,578 B2 * | 3/2013 | Parikh et al. | 244/132 |
| 2005/0183260 A1 | 8/2005 | Meyer | |
| 2006/0248854 A1 * | 11/2006 | Bartley-Cho et al. | 52/782.1 |
| 2008/0067289 A1 | 3/2008 | Meyer | |
| 2009/0020646 A1 | 1/2009 | Normand et al. | |
| 2009/0121081 A1 * | 5/2009 | Karem | 244/119 |
| 2010/0170994 A1 * | 7/2010 | Burns et al. | 244/130 |
| 2010/0308170 A1 * | 12/2010 | Hadley et al. | 244/131 |
| 2012/0025022 A1 * | 2/2012 | Buchs et al. | 244/129.5 |

FOREIGN PATENT DOCUMENTS

| | | |
|---|---|---|
| FR | 2 915 458 | 10/2008 |
| JP | 5-286493 A | 11/1993 |
| WO | WO 98/58759 A1 | 12/1998 |
| WO | 2010 004157 | 1/2010 |

OTHER PUBLICATIONS

Office Action issued Mar. 24, 2015 in Japanese Patent Application No. 2012-516817 (submitting English translation only).

* cited by examiner

FUSELAGE ELEMENT COMPRISING A FUSELAGE SEGMENT AND JOINING MEANS

This invention relates to a fuselage element.

More particularly, it relates to a fuselage element comprising a fuselage section and junction means able to connect the fuselage section to an adjacent section.

The fuselage of an aircraft comprises in particular a skin and stiffeners for this skin. The stiffeners are arranged either in a longitudinal direction (known as stringers), or in a plane transverse to the axis of the fuselage (known as frames).

The fuselage generally comprises several fuselage sections assembled with each other. These fuselage sections are assembled by means of junctions. The purpose of the junctions is in particular to transfer mechanical loads between adjacent sections.

In general, the fuselage, as well as the junctions, has a cylindrical shape, although other shapes may be considered.

There are junctions that are designed so as to ensure the continuity of the stringers. The document FR 2 910 874 describes junctions designed in this way.

These junctions comprise mechanical junction elements such as a ferrule and stringer joint plates. The ferrule makes it possible to connect the skins of the two adjacent sections and the stringer joint plates make it possible to connect the stringers or longitudinal stiffeners.

An example of such a design is shown on FIG. 1. This Figure shows two adjacent fuselage sections 1a, 1b. The fuselage has a cylindrical shape and comprises a skin 3, as well as a frame 4 situated in a plane transverse to the fuselage and stringers 5 situated in a longitudinal plane. A cylindrical junction 6 is arranged between these two cylindrical fuselage sections 1a, 1b at frame 4. This junction 6 comprises a ferrule 7, situated on the inner surface of skin 3 of the fuselage and connecting skins 3 of the two sections 1a, 1b, as well as stringer joint plates 8 situated respectively on stringers 5 and connecting stringers 5 of the two sections 1a, 1b.

Other types of junctions are not intended for the continuity of the stringers, that is to say that the stringers of a fuselage section stop at the junction and are not connected to the stringers of the adjacent section.

The absence of continuity of the stringers at the junctions may cause problems of local stability because the continuity of the stringers is interrupted and secondary moments are generated in the transition zone between the frame and the ends of the stringers. Thus, for example, during an applied tension or compression, the skin is acted upon and so is the frame due to the secondary moments.

In this context, the frame constitutes a more effective bearing point when it is situated as close as possible to the stopping point of the stringers. It is in this way that the mechanical load is transmitted most effectively between two adjacent fuselage sections.

Thus, one solution (shown on FIG. 2) consists in adding respectively small stringer joint plates 9 overlapping between ends 5e of stringers 5 and base plate 4a of frame 4 (part of frame 4 bearing on skin 3 of the fuselage).

In the solution of FIG. 1, assembly difficulties may be encountered when stringers 5 to be connected by means of stringer joint plate 8 are not perfectly aligned with each other.

Concerning FIG. 2, such a solution involves an increase in the number of parts to be installed during assembly of the fuselage. It will be noted that the number of parts in this case is double the number necessary when stringer joint plates are used in the case of junctions with continuity of the stringers.

Another solution (shown on FIG. 3) adopted for the purpose of increasing the capacity of the junction for transferring a stress consists in a counter-joint plate 10 connecting stringers 5. Moreover, in order to stabilize frame 4, a stabilizer for frame 40 is integrated into this structure. In certain embodiments, it is possible to place a second ferrule 7b on the outer surface of skin 3, in addition to inner ferrule 7.

Nevertheless, as for the preceding solution, the number of parts is increased, and that entails a greater assembly complexity, as well as an increase in the mass of the fuselage.

Moreover, in the case of the presence of a ferrule on the outer surface of the skin, that may lead to aerodynamic disturbances.

Furthermore, in these different cases, the presence of the internal ferrule moves the stringers away from the frame, which weakens the mechanical structure of the whole and may make it necessary, as indicated above, to provide joint plates to ensure the continuity of this structure.

This invention has the purpose of resolving the aforesaid drawbacks and proposing a fuselage element comprising a fuselage section and a junction element between this section and an adjacent section, making it possible to avoid aerodynamic disturbances at the junction element while reducing the complexity of the assembly and limiting the increase in mass.

To this end, according to a first aspect, this invention applies to a fuselage element comprising a fuselage section comprising a skin and junction means able to connect the skin of the said section to an adjacent section, the said section extending along the longitudinal axis of the fuselage, and the skin comprising at least one first part, at least one end of the said section, the fuselage section comprising at least one longitudinal stiffener element for the fuselage, the fuselage element being characterized in that the said junction means are placed in contact with an outer surface of the said first part of the skin and in that the stiffener element extends in part at the junction means along the longitudinal axis (that is to say that the respective projections of the stiffener element and the junction means on the longitudinal axis partially overlap).

In this way, because of the arrangement of the junction means on the outer surface of the skin of the fuselage, the stiffener elements (in practice stringers) of two adjoining sections may come closer, which imparts a good mechanical structure, even without a joint plate. Consequently, the mechanical load is transmitted effectively between the two adjacent fuselage sections and stability at the junction means thus is improved, in comparison with junctions of the state of the art with stopping of longitudinal stiffeners at the junction element.

Moreover, it may be provided that the skin comprises a second part that is not in contact with the junction means and that the outer surface of the said at least one first part of the skin is offset transversely toward the longitudinal axis of the fuselage in relation to an outer surface of the second part of the skin so that an outer surface of the said junction means is positioned at the same level as the said outer surface of the second part of the skin.

In this way the outer surface of the fuselage is smooth, thus avoiding aerodynamic disturbances.

It further may be provided that the fuselage section comprises a stiffener frame for the fuselage, in which case an end of the stiffener elements comes to adjoin the frame. In this case, a special advantage is taken of the structure proposed above.

The stiffener frame for the fuselage may extend in a transverse plane (subsequently referred to as frame) and comprising a body extending in a plane transverse to the longitudinal axis of the fuselage, and a base plate extending in a plane longitudinal to the longitudinal axis of the fuselage.

According to a conceivable solution, the junction means are installed at the said stiffener frame.

Thus, by virtue of the presence of this stiffener frame at the junction means, the fuselage is stable at the junction zone between two fuselage sections.

According to one embodiment, the inner surface of the junction means is fastened onto the said base plate of the said stiffener frame.

This makes it possible in particular to facilitate the assembly of two fuselage sections by virtue of the preassembly of the frame on the junction means (in practice a ferrule).

According to another embodiment, the base plate of the stiffener frame is installed on the inner surface of the skin of the first part.

This arrangement of the frame makes it possible to move the fuselage section even closer to the adjacent fuselage section. The skin of the two adjacent sections then is brought closer, and the mechanical loads then are transmitted more effectively between the fuselage sections.

Furthermore, when the fuselage element is assembled with a second fuselage element by way of junction means, the assembly is simplified because the frame is installed on the fuselage element.

Moreover, the positioning tolerance of the frame on the junction means is avoided, and consequently the sum of the transverse positioning tolerances of the junction means in relation to the fuselage section is reduced.

According to another embodiment, the fuselage element comprises a ring extending toward the longitudinal axis of the fuselage, in a plane transverse to the longitudinal axis of the fuselage, adapted for fastening the body of the stiffener frame.

In this embodiment, the frame does not comprise any base plate. As a result, the fuselage element may be brought closer to the adjacent fuselage element. In this way, the skin and the stringers of the two sections respectively are brought closer, allowing the mechanical loads to be transmitted more effectively between the sections.

Moreover, the positioning of the frame on the ring arranged in a plane transverse to the longitudinal axis of the fuselage does not entail any impact on the transverse positioning tolerance of the junction means in relation to the fuselage section.

In one embodiment, the junction means comprise a junction element.

In another embodiment, the junction means comprise a skin part situated at the end of the adjacent fuselage section.

According to a second aspect, this invention applies to a fuselage portion comprising a fuselage element in accordance with the invention and a second fuselage section being connected to the skin of the fuselage section of the fuselage element.

According to a conceivable solution, the second section extends along the longitudinal axis of the fuselage and the skin comprises at least one first part, at least one end of the said section, in contact with a junction element and a second part that is not in contact with the junction element. The junction element is in contact with an outer surface of the said at least one first part of the skin, and the outer surface of the at least one first part of the skin is offset transversely toward the longitudinal axis of the fuselage in relation to an outer surface of the second part of the skin, so that an outer surface of the said junction element is positioned at the same level as the said outer surface of the second part of the skin.

According to another conceivable solution, the second section extends along the longitudinal axis of the fuselage and the skin comprises at least one first part, at least one end of the section, in contact with the first part of the first section.

According to a third aspect, this invention applies to an aircraft fuselage comprising at least one fuselage portion in accordance with the invention.

According to a fourth aspect, this invention applies to an aircraft comprising a fuselage in accordance with the invention.

This fuselage portion, this aircraft fuselage and this aircraft have characteristics and advantages similar to those described above with reference to the fuselage element.

Other features and advantages of the invention also will become apparent in the description below.

On the attached drawings, provided by way of non-limitative examples:

Figure 1:
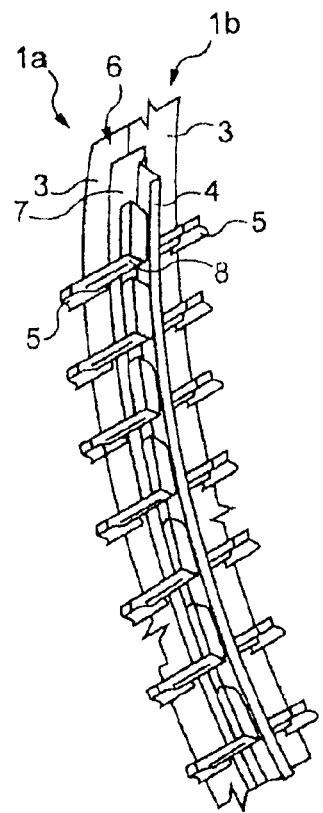
FIG. 1 is a diagram illustrating a fuselage element portion connected to a second fuselage element belonging to the prior art.
Figure 2:
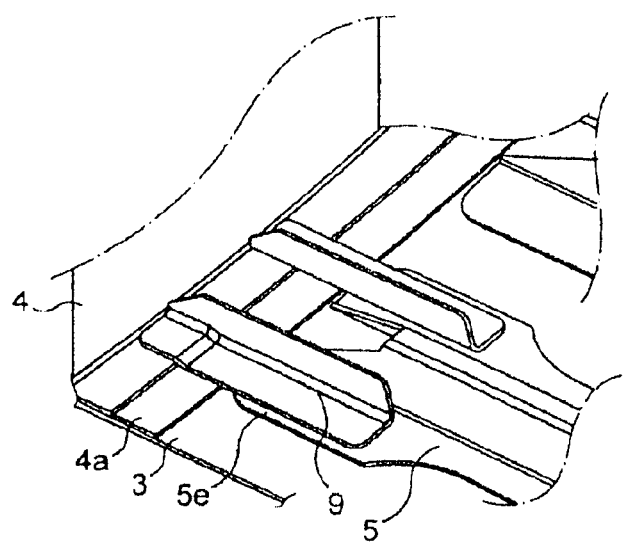
FIG. 2 shows a detail of a fuselage element belonging to the prior art.
Figure 3:
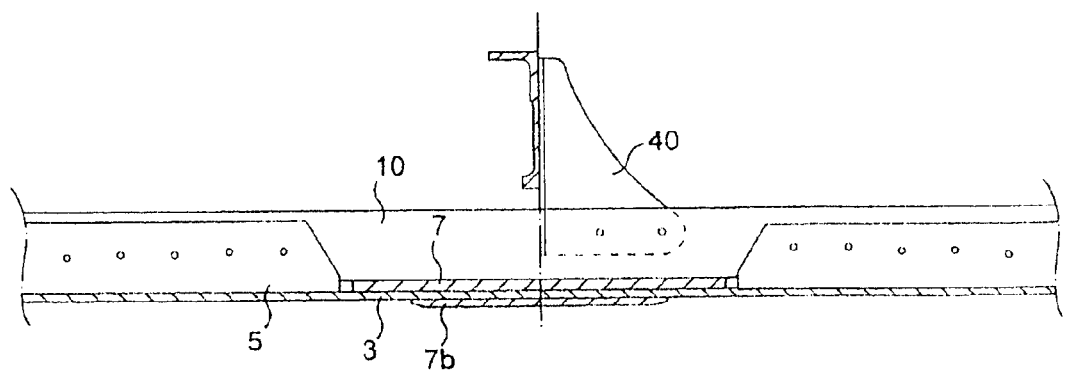
FIG. 3 is a diagram illustrating a fuselage element portion connected to a second fuselage element belonging to the prior art.
Figure 4:
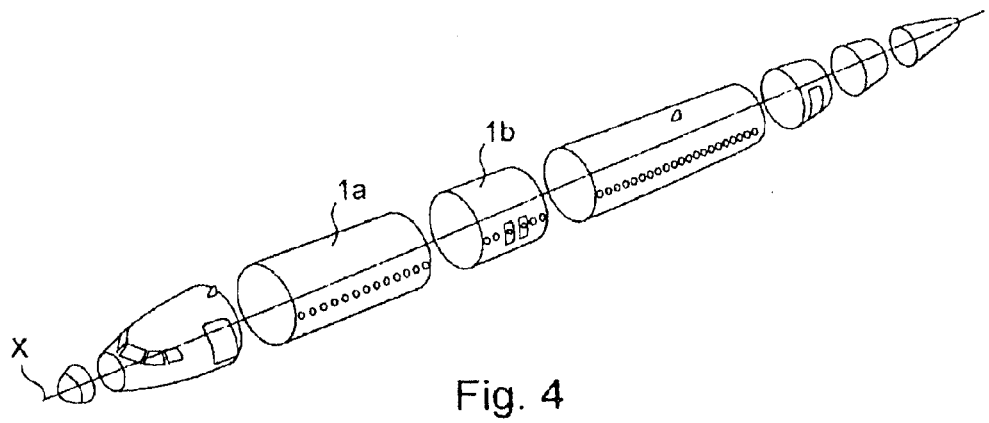
FIG. 4 is a diagram illustrating fuselage sections of an aircraft.

FIG. 4 shows several fuselage sections 1a, 1b. These fuselage sections are assembled with each other so as to form the fuselage of an aircraft. Two fuselage sections 1a, 1b are assembled by junction means (not shown on FIG. 4) as will be described below.

The fuselage sections extend along a longitudinal axis X.

Here, the shape of the fuselage sections is cylindrical, and consequently the junction means have the same shape.

Nevertheless, the fuselage sections, as well as the junction means, may have different shapes.

A first embodiment in accordance with the invention is going to be described with reference to FIG. 5.

Figure 5:
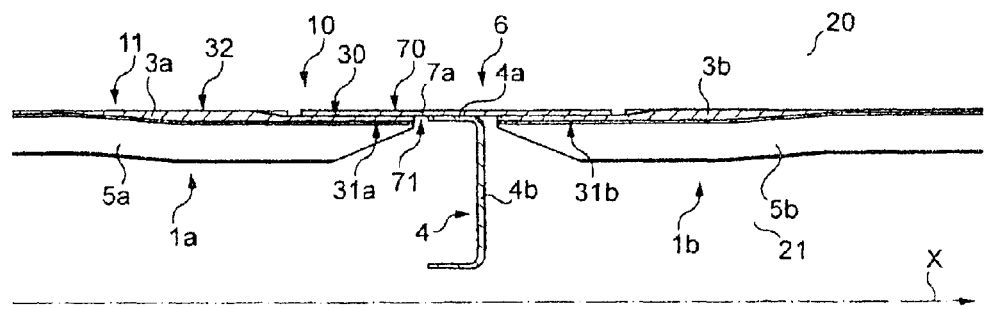
FIG. 5 is a diagram illustrating a first embodiment in accordance with the invention.

FIG. 5 shows a view in longitudinal section of a fuselage portion. It will be noted that a view in longitudinal section of a fuselage portion comprises two parts mutually symmetrical in relation to longitudinal axis X of the fuselage. FIG. 5 shows only a part of the view in longitudinal section.

Reference 20 shows the outside of the fuselage (for example the ambient air) and reference 21 shows the inside of the fuselage, that is to say the cockpit of the aircraft.

A first fuselage section 1a is connected to a second fuselage section 1b by junction means 6.

In this embodiment, the junction means are a junction element 6. Here, junction element 6 comprises a ferrule 7a.

For simplicity, first fuselage section 1a is going to be described, since second section 1b is similar.

Fuselage section 1a comprises a skin 3a, stiffeners that extend in longitudinal planes or stringers 5a, and stiffeners that extend in transverse planes or frames 4 (visible on this Figure at junction element 6).

Skin 3a of fuselage section 1a comprises at least one first part 10 situated at the end of section 1a and one second part 11.

Here, a portion of each section 1a, 1b is shown. Thus, only one end of sections 1a, 1b is shown. The end of section 1a, 1b not visible may or may not be designed in a manner identical to first part 10.

First part 10 is offset transversely toward inside 21 of the fuselage in relation to second part 11. Thus, for example, when the fuselage has a cylindrical shape, the diameter of a cross section of first part 10 is less than the diameter of a cross section of second part 11.

By way of example in no way limitative, the diameter of first part 10 is 4000 mm and that of the second part is 4008 mm.

First part 10 thus is recessed toward the inside of the fuselage in relation to second part 11. In one embodiment, this allows a ferrule 7a to come to be accommodated in the recess, so that outer surface 70 of ferrule 7a is at the same distance from the axis of the fuselage as outer surface 32 of second section part 11. It will be noted that inner surface 71 of ferrule 7a is in contact with outer surface 30 of skin 3a of first part 10.

According to one variant, the offset between first part 10 and second part 11, that is to say the difference between the diameters of the cross sections of the first and second parts respectively, is more or less similar to the thickness of the ferrule (mentioned below).

According to a second variant, the thickness of ferrule 7a is less than the offset between first part 10 and second part 11. In this case, other elements, here with cylindrical shapes, are arranged between the ferrule and the skin.

In this way, the outer surface of the fuselage is continuous and aerodynamic disturbances are avoided.

It will be noted that ferrule 7a is in contact with outer surface 30 of first part 10, this contact being able to be direct (that is to say that there is no other element between them) or indirect (that is to say that other elements are placed between them).

As indicated above, in order to connect first section 1a and second section 1b, a junction element 6 is arranged between the two fuselage sections 1a, 1b. This junction element 6 comprises a ferrule 7a situated in contact with external surface 30 of skin 3a of section 1a and of skin 3b of second section 1b.

In this way, skin 3a of first section 1a and skin 3b of second section 1b are connected by ferrule 7a. Ferrule 7a ensures the mechanical continuity between two adjacent sections 1a, 1b.

Consequently, a mechanical load borne by skin 3a of first section 1a is transmitted to skin 3b of second section 1b through ferrule 7a. The fuselage then is stable at junction element 6a for a given load level. The stability is clearly improved in comparison with a junction with stopping of stringers at the junction element and with an internal ferrule.

Furthermore, since ferrule 7a is arranged in contact with outer surface 30 of skin 3a, 3b of fuselage sections 1a, 1b, the ends of the fuselage sections may come closer to one another.

Consequently, skin 3a, 3b and stringers 5a, 5b of two adjacent sections 1a, 1b are separated only by the frame described farther on, and therefore are closer than in the prior art. Transmission of mechanical loads between adjacent sections then is more effective.

By way of example in no way limitative, ferrule 7a is covered by stringers 5a, 5b over approximately 80% of its length. Approximately 40% corresponds to a first stringer 5a and 40% to a second stringer 5b.

In this example, junction element 6 is arranged at a frame 4.

In this way, the mechanical loads to be transmitted between two fuselage sections 3a, 3b are distributed between ferrule 7a and frame 4. The stability of the fuselage at junction 6 therefore is increased.

Here, frame 4 comprises in particular a base plate 4a and a body 4b. Base plate 4a corresponds to the part of frame 4 that extends in a longitudinal plane and body 4b to the part that extends in a transverse plane.

In this example, base plate 4a is fastened onto inner surface 71 of ferrule 7a.

Nevertheless, base plate 4a of frame 4 could be fastened onto inner surface 31a, 31b of skin 3a, 3b of one of sections 1a, 1b.

The recessing of first part 10 of sections 1a, 1b in relation to second part 11 may be implemented by various techniques, according in particular to the material of which the fuselage is made.

This will be described in detail below with reference to FIGS. 12a, 12b, 12c and 13.

Figure 6:
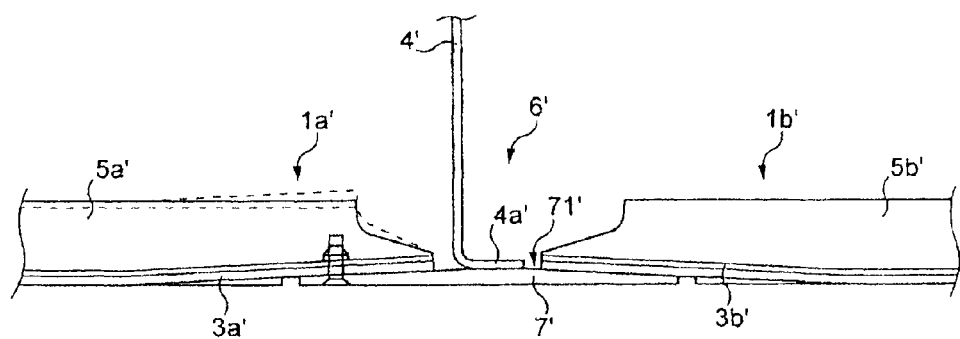
FIG. 6 is a diagram illustrating a second embodiment in accordance with the invention.

A second embodiment is shown on FIG. 6. The design of this embodiment is identical to that of the embodiment shown on FIG. 5.

Thus, ferrule 7' connects skin 3a', 3b' of the two sections 1a', 1b' and base plate 4a' of frame 4' is fastened to inner surface 71' of ferrule 7'.

In this embodiment, ferrule 7' has a convex inner surface 71', not being parallel to longitudinal axis X of the fuselage.

In this embodiment, ferrule 7' has a conical shape and makes it possible to have fewer irregularities on the skin of the fuselage. In this way, aerodynamic disturbances are less substantial.

Moreover, the conical shape makes it possible to facilitate the assembly of the two adjacent sections 1a', 1b'.

Thus for example, to begin with, ferrule 7' is assembled at the end of one of the fuselage sections (for example, first section 1a'). Subsequently, second section 1b is assembled, adjusting the position along ferrule 7' (according to longitudinal axis X) so that the outer surfaces of skin 3a', 3b' of sections 1a', 1b' are at the same level.

In this way, the radial plays existing between ferrule 7' and the skin of the fuselage are compensated.

This embodiment, like the preceding embodiment, allows stringers 5a', 5b' of the two sections 1a', 1b' to be positioned close to one another, and consequently close to frame 4'. In this way, the mechanical loads are transmitted effectively between two sections 1a', 1b'.

Figure 7:
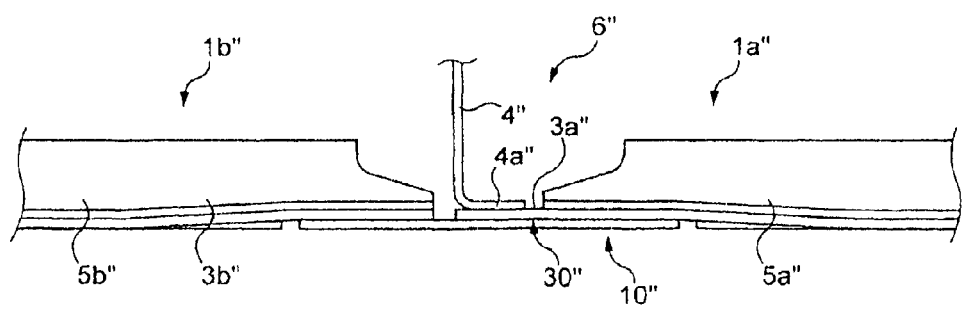
FIG. 7 is a diagram illustrating a third embodiment in accordance with the invention.

A third embodiment is shown on FIG. 7. The design of this embodiment is identical to those of the embodiments shown on FIGS. 5 and 6.

In this embodiment, skin 3a" of a first section 1a" is extended longitudinally so that frame 4" is fastened to skin 3a" by its base plate 4a".

In this way, the distance between this section 1a" and adjacent section 1b" may be reduced, making the fuselage more stable at junction 6".

In fact, skin 3a", 3b", as well as stringers 5a", 5b" of the two sections 1a", 1b" are close.

Moreover, since frame 4" is pre-fastened to first section 1a", one less element must be fastened transversely during assembly of two adjacent sections 1a", 1b". That avoids introduction of a transverse positioning tolerance of frame 4" at the junction.

Figure 8:
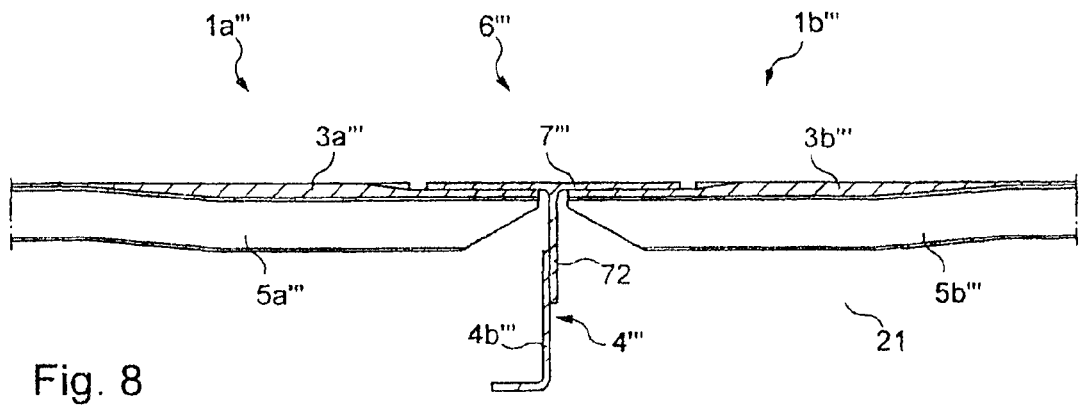
FIG. 8 is a diagram illustrating a fourth embodiment in accordance with the invention.

FIG. 8 illustrates a fourth embodiment. The design of this embodiment is identical to those of the embodiments shown on FIGS. 5, 6 and 7.

In this embodiment, junction element 6''' comprises a ring 72 made in one piece with ferrule 7'''. Ring 72 extends in a plane transverse to ferrule 7''' (or transverse to longitudinal axis X of the fuselage) toward inside 21 of the fuselage.

In this example, frame 4''' (which does not have any base plate) is fastened via its body 4b''' to ring 72. This ring 72 thus comprises fastening means (not visible on the Figure), such as, for example, clamping means.

By virtue of the fastening of frame 4''' to ring 72 of ferrule 7''', the transverse positioning tolerance of frame 4''' on junction element 6''' is avoided.

Moreover, because of the absence of a base plate in frame 4''', stringers 5a''', 5b''' of the two sections 1a''', 1b''' are brought very close to one another.

A fifth embodiment now is going to be described with reference to FIG. 9.

As for the preceding embodiments, skin 300a of a first fuselage section 100a comprises a first part 100 situated at the end of first section 100a and a second part 110. In the same way, first part 100 is offset toward inside 21 of the fuselage in relation to second part 110.

In this embodiment, junction means 6a comprise a part of adjacent fuselage section 100b.

Thus, in this embodiment, skin 300b of a second fuselage section 100b comes to be accommodated in the recess formed by first part 100 of first section 100a where skins 300a, 300b are fastened to one another.

In this embodiment, frame 40 is fastened to inner surface 310a of first part 100 of skin 300a of first fuselage section 100a.

Nevertheless, frame 40 may be fastened to inner surface 310b of skin 300b of second fuselage section 100b.

This configuration has the advantage of bringing skin 300a, 300b of two fuselage sections 100a, 100b closest, since they are in contact. Among other things, stringers 50a, 50b are brought close to frame 40 as in the preceding examples.

Consequently, the stability of the fuselage at junction 6a is improved.

This, as indicated below, improves the mechanical performance of the fuselage at the junction, that is to say that the transmission of mechanical loads is effective.

Moreover, the number of parts to be assembled during assembly of two fuselage sections 100a, 100b is reduced, and consequently the length of assembly time is reduced.

In the same way as in the cases where a ferrule is used in the junction element, since the outer surface of the fuselage is continuous, aerodynamic disturbances are avoided.

Figure 10:
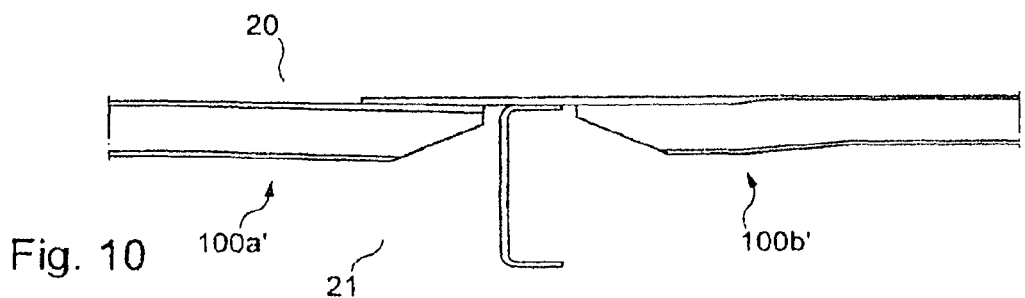
FIG. 10 is a diagram illustrating a sixth embodiment in accordance with the invention.

FIG. 10 shows a sixth embodiment close to the embodiment shown on FIG. 6, but in the case of the junction element comprising a part of the adjacent fuselage section.

Here, the end of first fuselage section 100a' and second fuselage section 100b' has a complementary conical shape. Thus, in this example, the end of first section 100a' is curved toward inside 21 of the fuselage (outer conical shape) and the thickness of the skin situated at the end of second fuselage section 100b' decreases when the end is approached (inner conical shape). The end of second section 100b' has a cylindrical shape outside.

The advantages of this embodiment corresponding to the advantages of the preceding embodiment and of the one described with reference to FIG. 6.

Figure 11:
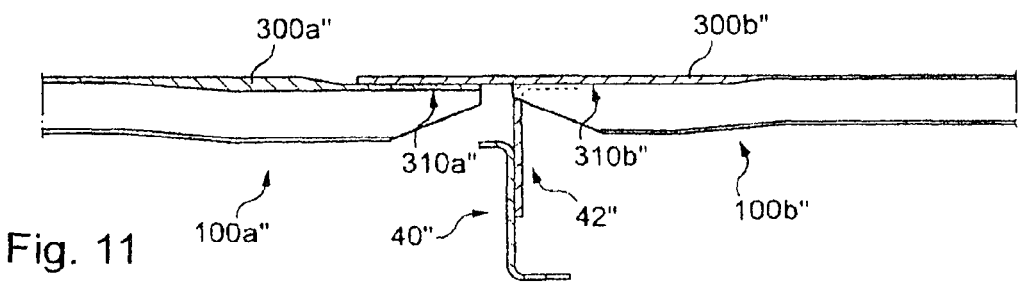
FIG. 11 is a diagram illustrating a seventh embodiment in accordance with the invention.

FIG. 11 shows a seventh embodiment in which the junction element comprises an adjacent fuselage section part.

Here, frame 40" is a floating frame that is fastened onto inner surface 310b" of skin 300b" of second fuselage section 100b" by means of a junction part 42" called "clamp."

In a variant, frame 40" may be fastened onto inner surface 310a" of skin 300a" of first fuselage section 100a".

This embodiment combines the advantages of the fourth (FIG. 8) embodiment.

Figure 9:
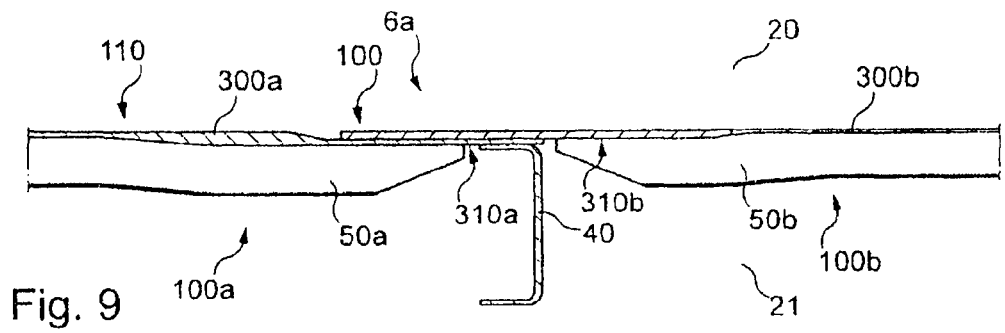
FIG. 9 is a diagram illustrating a fifth embodiment in accordance with the invention.

Moreover, the end of the longitudinal stiffeners or stringers of second section 100b" is even closer to the end of the other fuselage section 100a", for example in comparison with the fifth embodiment (FIG. 9).

Of course, the junction element may comprise a ferrule instead of the adjacent fuselage section part. Floating frame 40" then could be fastened onto the ferrule or onto the inner surface of the skin of one of the sections.

In this embodiment, the ends of the fuselage sections may have a complementary conical shape as in the embodiment shown on FIG. 10.

The manner of implementing the recess by machining of the first part of the fuselage sections in relation to the second part is going to be described next.

Thus, for example when the fuselage is metal, the recess is implemented by machining. The fuselage resulting from such a technique is shown on FIG. 12a.

It will be noted that in order to implement the recess in a metal fuselage, it is necessary to start with a panel of considerable thickness. The end of the fuselage section also may be produced by local deformation of the skin (FIG. 12c).

Figure 12A:
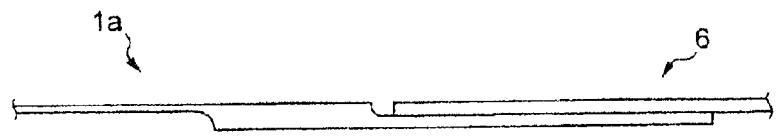
FIGS. 12a, 12b and 12c show a diagram illustrating a longitudinal section of a fuselage element portion connected to a second fuselage element between two longitudinal stiffeners in accordance with the invention.
Figure 12B:
Figure 12C:
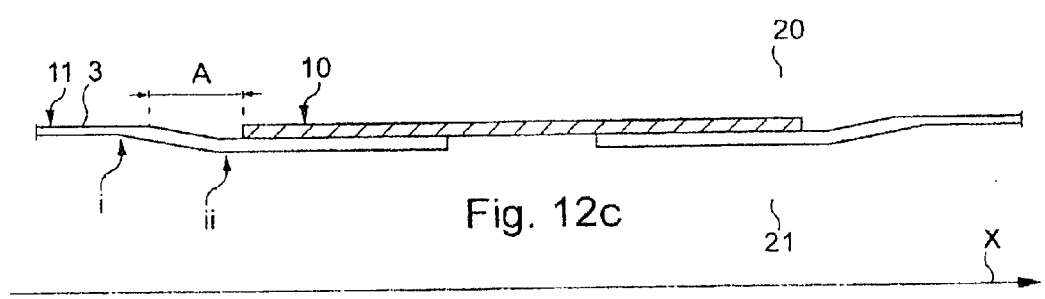

For example, when the fuselage is made of a composite, the recess is implemented by means of take-up and release of folds (the fuselage resulting from such a technique is shown on FIG. 12b) or by means of a joggling via local deformation of the skin (the fuselage resulting from such a technique is shown on FIG. 12c). It will be noted that the end contour obtained is similar for the metal or composite fuselage in the case of a local deformation of the skin (FIG. 12c).

In the last two cases, plays A, A' generated during implementation of the recess are variable according to the zone of the fuselage and the characteristics of the tools for implementing the recess.

These plays A, A', able to bring about aerodynamic disturbances, are maximally reduced, for example by filling them in with the aid of mastics or by adding miters 12 (visible on FIG. 12b).

The slant of fuselage skin 3 situated between first fuselage part 10 and second fuselage part 11 may have similar or different values on inside 21 and outside 20 of the fuselage.

In the case of the fuselage of FIG. 12c, the discontinuities i, ii bring about the introduction of moments. In order to minimize these moments, the fuselage of FIG. 12b is used.

Figure 13:
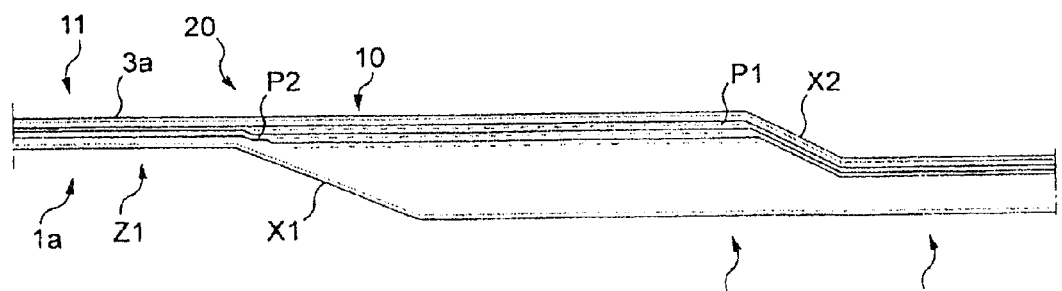
FIG. 13 shows FIG. 12b in detail.

FIG. 13 shows the portion of the fuselage of FIG. 12b in detail.

This fuselage portion comprises three zones. A first zone or typical zone Z1 corresponding to second part 11 of skin 3a of first fuselage section 1a.

A second zone or junction zone Z2, corresponding to first part 10 of skin 3a of first fuselage section 1a.

Finally, a third zone or transition zone Z3 is situated between the two preceding zones Z1, Z2.

In this technique, inset folds P1 (in broken line) are introduced between folds P2 (in continuous line) present in typical zone Z1, in alternating manner so as to observe the stacking rules.

The folds extend longitudinally and form skin 3 of the fuselage.

Folds P2 of typical zone Z1 are continuous up to the end of fuselage section 1a.

By way of example in no way limitative, 26 inset folds P1 are introduced in transition zone Z3 and extend up to the end of the section, and 26 other inset folds P1 are introduced in transition zone Z3 and are present only in this zone. These inset folds P1 are concentric and more or less parallel to each other. They are introduced in order to reinforce the skin.

For example, the slant of the skin on inside 21 of the fuselage (slope x1) has a value of 10%, the slant of the skin on outside 20 of the fuselage (slope x2) having a value of 20%.

Of course, the number of folds and the slant values may vary according to the embodiments. In fact, these techniques evolve very rapidly and consequently their values vary very rapidly over time.

Thus, by virtue of this invention, it is possible to assemble two adjacent fuselage sections by way of junction means that have a high stability.

Furthermore, the junction means do not connect the stringers of the two sections, thus limiting the increase in mass.

Moreover, assembly difficulty is reduced, and consequently assembly time also is reduced.

Of course, many modifications may be made to the exemplary embodiment described above without departing from the context of the invention.

Thus, for example, as already indicated, the shapes of the fuselage may be different.

The invention claimed is:

1. A fuselage element of a fuselage comprising:
   a fuselage section including a skin, the fuselage section extending along a central longitudinal axis of the fuselage;
   a stiffener frame;
   an adjacent section; and
   a junction member, the junction member including an inner surface and an outer surface,
   wherein the skin includes a first part at at least one end of the fuselage section, the first part of the skin including an inner surface and an outer surface,
   wherein the fuselage section includes at least one longitudinal stiffener element for the fuselage element,
   wherein the junction member connects the fuselage section to the adjacent section, the inner surface of the junction member being placed in contact with both the stiffener frame and the outer surface of the first part of the skin,
   wherein a part of the at least one longitudinal stiffener element extends to the junction member along the longitudinal axis such that said part of the at least one longitudinal stiffener element abuts the inner surface of the first part of the skin, and
   wherein the junction member contacting the outer surface of the first part of the skin overlaps with the part of the at least one longitudinal stiffener element extending to the junction member and abutting the inner surface of the first part of the skin.

2. The fuselage element in accordance with claim 1, wherein the skin includes a second part that is not in contact with the junction member, and
   wherein the outer surface of the first part of the skin is offset transversely toward the central longitudinal axis of the fuselage in relation to an outer surface the second part of the skin such that an outer surface of the junction member is positioned leveled with the outer surface of the second part of the skin.

3. The fuselage element in accordance with claim 1, wherein one end of the at least one longitudinal stiffener element adjoins the stiffener frame.

4. The fuselage element in accordance with claim 1, wherein the stiffener frame for the fuselage includes a body that extends transversely with respect to the central longitudinal axis of the fuselage, and
   wherein the stiffener frame for the fuselage includes a base plate that extends in parallel with the central longitudinal axis of the fuselage.

5. The fuselage element in accordance with claim 4, wherein the inner surface of the junction member is in contact with the base plate of the stiffener frame.

6. The fuselage element in accordance with claim 1, wherein the junction member includes a junction element.

7. The fuselage element in accordance with claim 6, wherein the junction element is a ferrule.

8. The fuselage element in accordance with claim 7, wherein the thickness of the ferrule is approximately equal to an offset between the first part of the skin and a second part of the skin, the second part of the skin being a portion that is not in contact with the junction member.

9. The fuselage element in accordance with claim 1, wherein the junction member includes a skin part situated at an end of the adjacent section.

10. The fuselage element in accordance with claim 1, wherein the adjacent section includes a skin, and
    wherein the junction member is an extension of the skin of the adjacent section and abuts the skin of the fuselage section.

11. An aircraft comprising the fuselage element according to claim 10.

12. The fuselage element in accordance with claim 10, wherein a first section of the skin of the fuselage section and a first section of the skin of the adjacent section each have a conical shape, and
    wherein a second section of the skin of the fuselage section and a second section of the skin of the adjacent section each have a cylindrical shape.

13. The fuselage element in accordance with claim 12, wherein the junction member includes a ferrule having a convex inner surface and a conical shape, the ferrule being assembled to the first section of the skin of the fuselage section and to the first section of the skin of the adjacent section.

14. The fuselage element in accordance with claim 10, wherein the skin of the fuselage section further includes a second part not in contact with the junction member,
    wherein the outer surface of the first part of the skin of the fuselage section is offset transversely toward the central longitudinal axis of the fuselage in relation to an outer surface of the second part of the skin of the fuselage section, and
    wherein the outer surface of the skin of the adjacent section does not include an offset section.

15. The fuselage element in accordance with claim 10, wherein the outer surface of skin of the fuselage section and an inner surface of the skin of the adjacent section have a complimentary conical shape.

16. The fuselage element in accordance with claim 1, wherein an end of the at least one longitudinal stiffener element overlaps with a first length of the junction member in a longitudinal direction parallel with the longitudinal axis, the first length of the junction member being less than an entire length of the junction member in the longitudinal direction.

17. The fuselage element in accordance with claim 1, wherein the junction member is integral with one of the fuselage section and the adjacent section.

18. The fuselage element in accordance with claim 1, wherein the at least one longitudinal stiffener element is a stringer.

19. The fuselage element in accordance with claim 1, wherein the at least one longitudinal stiffener element extends to and terminates at an edge of the first part of the skin.

20. The fuselage element in accordance with claim 1, wherein the adjacent section includes a skin, and the junction member contacts the stiffener frame between an edge of the skin of the adjacent section and an edge of the first part of the skin of the fuselage section.

* * * * *